US008126601B2

(12) United States Patent
Kapp et al.

(10) Patent No.: US 8,126,601 B2
(45) Date of Patent: Feb. 28, 2012

(54) SYSTEM AND METHOD FOR PREDICTING A VEHICLE ROUTE USING A ROUTE NETWORK DATABASE

(75) Inventors: Kevin Kapp, Melbourne, FL (US); Eric Vorndran, Melbourne, FL (US); Daniel Pagano, Melbourne, FL (US); Ajith Kuttannair Kumar, Erie, PA (US)

(73) Assignee: General Electric Company, Schenectady, NY (US)

( * ) Notice: Subject to any disclaimer, the term of this patent is extended or adjusted under 35 U.S.C. 154(b) by 963 days.

(21) Appl. No.: 12/047,427

(22) Filed: Mar. 13, 2008

(65) Prior Publication Data

US 2008/0154452 A1  Jun. 26, 2008

Related U.S. Application Data

(63) Continuation-in-part of application No. 11/765,443, filed on Jun. 19, 2007, and a continuation-in-part of application No. 11/669,364, filed on Jan. 31, 2007, and a continuation-in-part of application No. 11/385,354, filed on Mar. 20, 2006.

(60) Provisional application No. 60/894,039, filed on Mar. 9, 2007, provisional application No. 60/939,852, filed on May 24, 2007, provisional application No. 60/849,100, filed on Oct. 2, 2006, provisional application No. 60/850,885, filed on Oct. 10, 2006.

(51) Int. Cl.
*G05D 1/00* (2006.01)
*G06F 7/00* (2006.01)
*G06F 17/00* (2006.01)

(52) U.S. Cl. ............ 701/20; 701/19; 701/201; 701/202; 701/205; 701/207

(58) Field of Classification Search .................... 701/19, 701/20, 201, 202, 205, 207
See application file for complete search history.

(56) References Cited

U.S. PATENT DOCUMENTS 2,104,652 A   1/1938  Inman
(Continued)

FOREIGN PATENT DOCUMENTS

CH   642 418   4/1984
(Continued)

OTHER PUBLICATIONS

Razouqi et al. RYNSORD: A Novel, Decentralized Algorithm for Railway Networks with 'Soft Reservation', VTC, 1998, pp. 1585-2589, V3, New York, NY.

(Continued)

*Primary Examiner* — Khoi Tran
*Assistant Examiner* — Jorge Peche
(74) *Attorney, Agent, or Firm* — GE Global Patent Operation; John A. Kramer

(57) ABSTRACT

A system and method for predicting a route to be authorized by a dispatcher for a vehicle to travel on a route network comprises a computer system that has a database having stored data relative to interconnecting route segments that make up the route network. Data relative to the origination location and the destination location is input into the computer system. The processor accesses the database and generates a predicted route with an origination location and destination location.

52 Claims, 3 Drawing Sheets

U.S. PATENT DOCUMENTS

| | | | |
|---|---|---|---|
| 2,601,634 A | 6/1952 | Rivette | |
| 2,927,711 A | 3/1960 | Naggiar | |
| 3,519,805 A | 7/1970 | Thorne-Booth | |
| 3,650,216 A | 3/1972 | Harwick et al. | |
| 3,655,962 A | 4/1972 | Koch | |
| 3,781,139 A | 12/1973 | Lohse | |
| 3,794,833 A | 2/1974 | Blazek et al. | |
| 3,865,042 A | 2/1975 | DePaola et al. | |
| 3,886,870 A * | 6/1975 | Pelabon | 105/61.5 |
| 3,948,314 A | 4/1976 | Creswick et al. | |
| 4,005,838 A | 2/1977 | Grundy | |
| 4,041,283 A | 8/1977 | Mosier | |
| 4,042,810 A | 8/1977 | Mosher | |
| 4,136,432 A | 1/1979 | Melley, Jr. | |
| 4,181,943 A | 1/1980 | Mercer, Sr. | |
| 4,253,399 A | 3/1981 | Spigarelli | |
| 4,279,395 A | 7/1981 | Boggio et al. | |
| 4,344,364 A | 8/1982 | Nickles et al. | |
| 4,401,035 A | 8/1983 | Spigarelli et al. | |
| 4,548,164 A | 10/1985 | Ylonen et al. | |
| 4,561,057 A | 12/1985 | Haley, Jr. et al. | |
| 4,602,335 A | 7/1986 | Perlmutter | |
| 4,617,627 A | 10/1986 | Yasunobu et al. | |
| 4,644,705 A | 2/1987 | Saccomani et al. | |
| 4,663,713 A | 5/1987 | Cornell et al. | |
| 4,711,418 A | 12/1987 | Aver, Jr. et al. | |
| 4,735,385 A | 4/1988 | Nickles et al. | |
| 4,794,548 A | 12/1988 | Lynch et al. | |
| 4,827,438 A | 5/1989 | Nickles et al. | |
| 4,843,575 A | 6/1989 | Crane | |
| 4,853,883 A | 8/1989 | Nickles et al. | |
| 5,109,343 A | 4/1992 | Budway | |
| 5,181,541 A | 1/1993 | Bodenheimer | |
| 5,187,945 A | 2/1993 | Dixon | |
| 5,197,627 A | 3/1993 | Disabato et al. | |
| 5,239,472 A | 8/1993 | Long et al. | |
| 5,240,416 A | 8/1993 | Bennington | |
| 5,253,153 A | 10/1993 | Mathews et al. | |
| 5,316,174 A | 5/1994 | Schutz | |
| 5,363,787 A | 11/1994 | Kkonopasek et al. | |
| 5,388,034 A | 2/1995 | Allen et al. | |
| 5,398,894 A | 3/1995 | Pascoe | |
| 5,437,422 A | 8/1995 | Newman | |
| 5,440,489 A | 8/1995 | Newman | |
| 5,460,013 A | 10/1995 | Thomsen | |
| 5,487,516 A | 1/1996 | Murata et al. | |
| 5,623,413 A | 4/1997 | Matheson et al. | |
| 5,642,827 A | 7/1997 | Madsen | |
| 5,651,330 A | 7/1997 | Jewett | |
| 5,676,059 A | 10/1997 | Alt | |
| 5,744,707 A | 4/1998 | Kull | |
| 5,755,349 A | 5/1998 | Brundle | |
| 5,758,299 A | 5/1998 | Sandborg et al. | |
| 5,785,392 A | 7/1998 | Hart | |
| 5,794,172 A | 8/1998 | Matheson et al. | |
| 5,803,411 A | 9/1998 | Ackerman et al. | |
| 5,828,979 A | 10/1998 | Polivka et al. | |
| 5,950,967 A | 9/1999 | Montgomery | |
| 5,957,571 A | 9/1999 | Koster et al. | |
| 5,998,915 A | 12/1999 | Scholz et al. | |
| 6,092,021 A | 7/2000 | Ehlbeck et al. | |
| 6,112,142 A | 8/2000 | Shockley et al. | |
| 6,123,111 A | 9/2000 | Nathan et al. | |
| 6,125,311 A | 9/2000 | Lo | |
| 6,129,025 A | 10/2000 | Minakami et al. | |
| 6,144,901 A * | 11/2000 | Nickles et al. | 701/19 |
| 6,198,993 B1 | 3/2001 | Higashi et al. | |
| 6,216,957 B1 | 4/2001 | Turunen, Jr. | |
| 6,230,668 B1 | 5/2001 | Marsh et al. | |
| 6,243,694 B1 | 6/2001 | Bonissone et al. | |
| 6,263,266 B1 | 7/2001 | Hawthorne | |
| 6,269,034 B1 | 7/2001 | Shibuya | |
| 6,270,040 B1 | 8/2001 | Katzer | |
| 6,308,117 B1 | 10/2001 | Ryland et al. | |
| 6,325,050 B1 | 12/2001 | Gallagher et al. | |
| 6,332,106 B1 | 12/2001 | Hawthorne et al. | |
| 6,363,331 B1 | 3/2002 | Kyrtsos | |
| 6,380,639 B1 * | 4/2002 | Soucy | 290/40 B |
| 6,404,129 B1 | 6/2002 | Hendricx et al. | |
| 6,434,452 B1 | 8/2002 | Gray | |
| 6,459,964 B1 | 10/2002 | Vu et al. | |
| 6,487,488 B1 | 11/2002 | Peterson, Jr. et al. | |
| 6,505,103 B1 | 1/2003 | Howell et al. | |
| 6,516,727 B2 | 2/2003 | Kraft | |
| 6,520,124 B2 | 2/2003 | Bohm, II | |
| 6,549,803 B1 | 4/2003 | Raghavan et al. | |
| 6,591,758 B2 | 7/2003 | Kumar | |
| 6,609,049 B1 | 8/2003 | Kane et al. | |
| 6,612,245 B2 | 9/2003 | Kumar et al. | |
| 6,612,246 B2 | 9/2003 | Kumar | |
| 6,615,118 B2 | 9/2003 | Kumar | |
| 6,647,328 B2 | 11/2003 | Walker | |
| 6,676,089 B1 | 1/2004 | Katzer | |
| 6,691,957 B2 | 2/2004 | Hess, Jr. et al. | |
| 6,694,231 B1 | 2/2004 | Rezk | |
| 6,698,913 B2 | 3/2004 | Yamamoto | |
| 6,702,235 B2 | 3/2004 | Katzer | |
| 6,732,023 B2 * | 5/2004 | Sugita et al. | 701/19 |
| 6,763,291 B1 | 7/2004 | Houpt et al. | |
| 6,789,005 B2 | 9/2004 | Hawthorne | |
| 6,810,312 B2 | 10/2004 | Jammu et al. | |
| 6,824,110 B2 | 11/2004 | Kane et al. | |
| 6,845,953 B2 | 1/2005 | Kane et al. | |
| 6,853,888 B2 | 2/2005 | Kane et al. | |
| 6,856,865 B2 * | 2/2005 | Hawthorne | 701/19 |
| 6,863,246 B2 | 3/2005 | Kane et al. | |
| 6,865,454 B2 | 3/2005 | Kane et al. | |
| 6,873,888 B2 | 3/2005 | Kumar | |
| 6,903,658 B2 | 6/2005 | Kane et al. | |
| 6,910,792 B2 | 6/2005 | Takada et al. | |
| 6,915,191 B2 | 7/2005 | Kane et al. | |
| 6,922,619 B2 | 7/2005 | Baig et al. | |
| 6,948,837 B2 | 9/2005 | Suzuki | |
| 6,953,272 B2 | 10/2005 | Hayakawa et al. | |
| 6,957,131 B2 | 10/2005 | Kane et al. | |
| 6,973,947 B2 | 12/2005 | Penaloza et al. | |
| 6,978,195 B2 | 12/2005 | Kane et al. | |
| 6,980,894 B1 | 12/2005 | Gordon et al. | |
| 6,996,461 B2 | 2/2006 | Kane et al. | |
| 7,021,588 B2 | 4/2006 | Hess, Jr. et al. | |
| 7,021,589 B2 | 4/2006 | Hess, Jr. et al. | |
| 7,024,289 B2 | 4/2006 | Kane et al. | |
| 7,036,774 B2 | 5/2006 | Kane et al. | |
| 7,072,747 B2 | 7/2006 | Armbruster et al. | |
| 7,072,757 B2 | 7/2006 | Adams et al. | |
| 7,073,753 B2 | 7/2006 | Root et al. | |
| 7,079,926 B2 | 7/2006 | Kane et al. | |
| 7,092,800 B2 * | 8/2006 | Kane et al. | 701/19 |
| 7,092,801 B2 * | 8/2006 | Kane et al. | 701/19 |
| 7,096,171 B2 | 8/2006 | Hawthorne et al. | |
| 7,131,403 B1 | 11/2006 | Banga et al. | |
| 7,164,975 B2 | 1/2007 | Bidaud | |
| 7,302,895 B2 | 12/2007 | Kumar et al. | |
| 7,347,168 B2 | 3/2008 | Reckels et al. | |
| 7,349,797 B2 | 3/2008 | Donnelly et al. | |
| 7,497,201 B2 | 3/2009 | Hollenbeck | |
| 7,500,436 B2 | 3/2009 | Kumar et al. | |
| 7,509,193 B2 | 3/2009 | Kustosch | |
| 7,522,990 B2 | 4/2009 | Daum et al. | |
| 7,618,011 B2 | 11/2009 | Oleski et al. | |
| 7,667,611 B2 | 2/2010 | Lindsey et al. | |
| 2001/0029411 A1 | 10/2001 | Hawthorne | |
| 2001/0047241 A1 | 11/2001 | Khavakh et al. | |
| 2002/0059075 A1 | 5/2002 | Schick et al. | |
| 2002/0072833 A1 | 6/2002 | Gray | |
| 2002/0093201 A1 | 7/2002 | Soucy | |
| 2002/0096081 A1 | 7/2002 | Kraft | |
| 2002/0107618 A1 | 8/2002 | Deguchi et al. | |
| 2002/0174653 A1 | 11/2002 | Uzkan | |
| 2003/0001050 A1 | 1/2003 | Katzer | |
| 2003/0034423 A1 | 2/2003 | Hess et al. | |
| 2003/0076221 A1 | 4/2003 | Akiyama et al. | |
| 2003/0091017 A1 | 5/2003 | Davenport et al. | |
| 2003/0104899 A1 | 6/2003 | Keller | |
| 2003/0105561 A1 | 6/2003 | Nickles et al. | |
| 2003/0120400 A1 | 6/2003 | Ahmed Baig et al. | |
| 2003/0183729 A1 | 10/2003 | Root et al. | |

| | | | |
|---|---|---|---|
| 2003/0213875 A1 | 11/2003 | Hess, Jr. et al. |
| 2003/0222981 A1 | 12/2003 | Kisak et al. |
| 2003/0229446 A1 | 12/2003 | Boscamp et al. |
| 2003/0233959 A1 | 12/2003 | Kumar |
| 2004/0068359 A1 | 4/2004 | Neiss et al. |
| 2004/0098142 A1 | 5/2004 | Warren et al. |
| 2004/0104312 A1 | 6/2004 | Hess et al. |
| 2004/0108814 A1 | 6/2004 | Tsuda et al. |
| 2004/0122569 A1 | 6/2004 | Bidaud |
| 2004/0129289 A1 | 7/2004 | Hafemann |
| 2004/0133315 A1* | 7/2004 | Kumar et al. ............... 700/302 |
| 2004/0172175 A1 | 9/2004 | Julich et al. |
| 2004/0174121 A1 | 9/2004 | Tsuda et al. |
| 2004/0245410 A1 | 12/2004 | Kisak et al. |
| 2005/0007020 A1 | 1/2005 | Tsuda et al. |
| 2005/0055287 A1 | 3/2005 | Schmidtberg et al. |
| 2005/0065674 A1 | 3/2005 | Houpt et al. |
| 2005/0085961 A1 | 4/2005 | Kane et al. |
| 2005/0109882 A1 | 5/2005 | Armbruster et al. |
| 2005/0120904 A1* | 6/2005 | Kumar et al. ............... 105/35 |
| 2005/0121005 A1 | 6/2005 | Edwards |
| 2005/0171655 A1 | 8/2005 | Flynn et al. |
| 2005/0171657 A1 | 8/2005 | Kumar |
| 2005/0188745 A1 | 9/2005 | Staphanos et al. |
| 2005/0196737 A1 | 9/2005 | Mann |
| 2005/0205719 A1 | 9/2005 | Hendrickson et al. |
| 2005/0251299 A1 | 11/2005 | Donnelly et al. |
| 2005/0288832 A1 | 12/2005 | Smith et al. |
| 2006/0041341 A1 | 2/2006 | Kane et al. |
| 2006/0047379 A1 | 3/2006 | Schullian et al. |
| 2006/0060345 A1 | 3/2006 | Flik et al. |
| 2006/0085103 A1 | 4/2006 | Smith, Jr. et al. |
| 2006/0085363 A1 | 4/2006 | Cheng et al. |
| 2006/0116789 A1 | 6/2006 | Subramanian et al. |
| 2006/0116795 A1 | 6/2006 | Abe et al. |
| 2006/0122737 A1 | 6/2006 | Tani et al. |
| 2006/0155434 A1 | 7/2006 | Kane et al. |
| 2006/0162973 A1 | 7/2006 | Harris et al. |
| 2006/0212188 A1 | 9/2006 | Kickbusch et al. |
| 2006/0277906 A1 | 12/2006 | Burk et al. |
| 2006/0282199 A1 | 12/2006 | Daum et al. |
| 2007/0061053 A1 | 3/2007 | Zeitzew |
| 2007/0108308 A1* | 5/2007 | Keightley ............... 238/29 |
| 2007/0112475 A1 | 5/2007 | Koebler et al. |
| 2007/0219680 A1 | 9/2007 | Kumer et al. |
| 2007/0219681 A1 | 9/2007 | Kumar et al. |
| 2007/0219683 A1 | 9/2007 | Daum et al. |
| 2007/0233364 A1 | 10/2007 | Kumar |
| 2007/0260369 A1 | 11/2007 | Philp et al. |
| 2007/0261648 A1 | 11/2007 | Reckels et al. |
| 2008/0004721 A1 | 1/2008 | Huff et al. |
| 2008/0128563 A1 | 6/2008 | Kumar et al. |
| 2008/0147256 A1 | 6/2008 | Liberatore |
| 2008/0208393 A1 | 8/2008 | Schricker |
| 2009/0140574 A1 | 6/2009 | Gorman et al. |
| 2009/0177345 A1 | 7/2009 | Severinsky et al. |
| 2009/0254239 A1 | 10/2009 | Daum et al. |
| 2009/0319092 A1 | 12/2009 | Piche |
| 2010/0152998 A1 | 6/2010 | Schwarzmann |

FOREIGN PATENT DOCUMENTS

| | | |
|---|---|---|
| DE | 197 26 542 | 11/1998 |
| DE | 198 30 353 | 2/2001 |
| DE | 199 35 349 | 2/2001 |
| DE | 199 35 353 | 2/2001 |
| DE | 100 45 921 | 3/2002 |
| EP | 0 594 226 | 9/1990 |
| EP | 0 428 113 | 11/1990 |
| EP | 1 136 969 | 7/2002 |
| EP | 1 297 982 | 4/2003 |
| EP | 1297982 A2 * | 4/2003 |
| EP | 1 466 803 | 10/2004 |
| EP | 1 253 059 | 8/2006 |
| FR | 2 129 215 | 10/1972 |
| FR | 2 558 806 | 1/1984 |
| FR | 2 767 770 | 9/1997 |
| GB | 482 625 | 12/1936 |
| JP | 60 028153 | 2/1985 |
| JP | 50-32733 | 9/1993 |
| JP | 06-108869 | 4/1994 |
| JP | 2001-065360 | 3/2001 |
| WO | WO 95/25053 | 9/1995 |
| WO | WO 99/14093 | 3/1999 |
| WO | WO 03/097424 | 11/2003 |
| WO | WO 2004/023517 | 3/2004 |
| WO | WO 2004/051699 | 6/2004 |
| WO | WO 2004/052755 | 6/2004 |
| WO | WO 2004/059446 | 7/2004 |
| WO | WO 2004/051700 | 7/2005 |
| WO | WO 2005/061300 | 3/2007 |
| WO | WO 2007/027130 | 3/2007 |
| WO | WO 2007/091270 | 8/2007 |

OTHER PUBLICATIONS

ISR and WO pertaining to International application No. PCT/US2009/032933 dated Nov. 3, 2009.
Chang et al. "Cycle Detection in Repair-Based Railway Scheduling System", Robotics and Automation, 1996 pp. 2517-2522, V3, New York, NY.
Grabs, Ulrike, "Modification of Electronic Interlocking EI S in Service", Signal + Draht, Telzlaff Verlag GmbH, 1995, pp. 254-258, V87(7/08), Darmstadt, DE.
Cheng, Yu, "Hybrid Simulation for Resolving Resource conflicts in Train Traffic Rescheduling", Computers in Industry, 1998, pp. 233-246, V35(3), Amsterdam, NL.
ISR and WO pertaining to International application No. PCT US2006/032893 dated Aug. 24, 2006.
ISR and WO pertaining to International application No. PCT/US2007/001428 dated Jan. 18, 2007.
ISR and WO pertaining to International application No. PCT/US2007/066697 dated Apr. 16, 2007.
ISR and WO pertaining to International application No. PCT/US2007/076699 dated Aug. 24, 2007.
ISR and WO pertaining to International application No. PCT/US2007/078001 dated Sep. 10, 2007.
ISR and WO pertaining to International application No. PCT/US2007/078016 dated Sep. 10, 2007.
ISR and WO pertaining to International application No. PCT/US2007/078118 dated Sep. 11, 2007.
ISR and WO pertaining to International application No. PCT/US2007/078340 dated Sep. 13, 2007.
ISR and WO pertaining to International application No. PCT/US2008/063193 dated May 9, 2008.
ISR and WO pertaining to International application No. PCT/US2008/083526 dated Nov. 14, 2008.
ISR and WO pertaining to International application No. PCT/US2009/031740 dated Jan. 23, 2009.
ISR and WO pertaining to International application No. PCT/US2009/032933 dated Feb. 3, 2009.
ISR and WO pertaining to International application No. PCT/US2009/037293 dated Mar. 16, 2009.
ISR and WO pertaining to International application No. PCT/US2009/045004 dated May 22, 2009.
ISR pertaining to International application No. PCT/US2010/035058 dated May 17, 2010.
ISR pertaining to International application No. PCT/US2010/047251 dated Aug. 31, 2010.

* cited by examiner

SYSTEM AND METHOD FOR PREDICTING A VEHICLE ROUTE USING A ROUTE NETWORK DATABASE

CROSS-REFERENCE TO RELATED APPLICATIONS

This application claims priority to and is a Continuation-In-Part of U.S. application Ser. No. 11/765,443 filed Jun. 19, 2007, which claims priority to U.S. Provisional Application No. 60/894,039 filed Mar. 9, 2007, and U.S. Provisional Application No. 60/939,852 filed May 24, 2007, and incorporated herein by reference in its entirety.

U.S. application Ser. No. 11/765,443 claims priority to and is a Continuation-In-Part of U.S. application Ser. No. 11/669,364 filed Jan. 31, 2007, which claims priority to U.S. Provisional Application No. 60/849,100 filed Oct. 2, 2006, and U.S. Provisional Application No. 60/850,885 filed Oct. 10, 2006, and incorporated herein by reference in its entirety.

U.S. application Ser. No. 11/669,364 claims priority to and is a Continuation-In-Part of U.S. application Ser. No. 11/385,354 filed Mar. 20, 2006, and incorporated herein by reference in its entirety.

BACKGROUND OF THE INVENTION

This invention relates to a powered system, such as a train, an off-highway vehicle, a marine, a transport vehicle or an agriculture vehicle, more particularly to a method and computer software code for optimized fuel efficiency, emission output, vehicle performance, infrastructure and environment mission performance of the diesel powered system. In addition, the present invention relates to systems or methods that are used to determine a route a vehicle is to follow on a road, track or route network. More specifically, the invention relates to a systems or methods that utilize data relative to a route networks to predict, and if necessary adapt a predicted route to optimize fuel efficiency during a planned trip or mission of the vehicle.

Some powered systems such as, but not limited to, off-highway vehicles, marine diesel powered propulsion plants, transport vehicles such as transport buses, agricultural vehicles, and rail vehicle systems or trains, are typically powered by one or more diesel power units, or diesel-fueled power generating units. With respect to rail vehicle systems, a diesel power unit is usually a part of at least one locomotive powered by at least one diesel internal combustion engine and the train further includes a plurality of rail cars, such as freight cars. Usually more than one locomotive is provided wherein the locomotives are considered a locomotive consist.

An operator is usually aboard a locomotive to insure the proper operation of the locomotive, and when there is a locomotive consist, the operator is usually aboard a lead locomotive. A locomotive consist is a group of locomotives that operate together in operating a train. In addition to ensuring proper operations of the locomotive, or locomotive consist, the operator also is responsible for determining operating speeds of the train and forces within the train that the locomotives are part of. To perform this function, the operator generally must have extensive experience with operating the locomotive and various trains over the specified terrain. This knowledge is needed to comply with prescribeable operating parameters, such as speeds, emissions and the like that may vary with the train location along the track. Moreover, the operator is also responsible for assuring in-train forces remain within acceptable limits.

In marine applications, an operator is usually aboard a marine vehicle to insure the proper operation of the vessel, and when there is a vessel consist, the lead operator is usually aboard a lead vessel. As with the locomotive example cited above, a vessel consist is a group of vessels that operate together in operating a combined mission. In addition to ensuring proper operations of the vessel, or vessel consist, the lead operator also is responsible for determining operating speeds of the consist and forces within the consist that the vessels are part of. To perform this function, the operator generally must have extensive experience with operating the vessel and various consists over the specified waterway or mission. This knowledge is needed to comply with prescribeable operating speeds and other mission parameters that may vary with the vessel location along the mission. Moreover, the operator is also responsible for assuring mission forces and location remain within acceptable limits.

In the case of multiple diesel power powered systems, which by way of example and limitation, may reside on a single vessel, power plant or vehicle or power plant sets, an operator is usually in command of the overall system to insure the proper operation of the system, and when there is a system consist, the operator is usually aboard a lead system. Defined generally, a system consist is a group of powered systems that operate together in meeting a mission. In addition to ensuring proper operations of the single system, or system consist, the operator also is responsible for determining operating parameters of the system set and forces within the set that the system are part of. To perform this function, the operator generally must have extensive experience with operating the system and various sets over the specified space and mission. This knowledge is needed to comply with prescribeable operating parameters and speeds that may vary with the system set location along the route. Moreover, the operator is also responsible for assuring in-set forces remain within acceptable limits.

However, with respect to a locomotive, even with knowledge to assure safe operation, the operator cannot usually operate the locomotive so that the fuel consumption is minimized for each trip. For example, other factors that must be considered may include emission output, operator's environmental conditions like noise/vibration, a weighted combination of fuel consumption and emissions output, etc. This is difficult to do since, as an example, the size and loading of trains vary, locomotives and their fuel/emissions characteristics are different, and weather and traffic conditions vary.

A train owner usually owns a plurality of trains wherein the trains operate over a network of railroad tracks. Because of the integration of multiple trains running concurrently within the network of railroad tracks, wherein scheduling issues must also be considered with respect to train operations, train owners would benefit from a way to optimize fuel efficiency and emission output so as to save on overall fuel consumption while minimizing emission output of multiple trains while meeting mission trip time constraints.

Likewise, owners and/or operators of off-highway vehicles, transportation vehicles, agricultural vehicles, marine powered propulsion plants, and/or stationary diesel powered systems would appreciate the financial benefits realized when these diesel powered system produce optimize fuel efficiency, emission output, fleet efficiency, and mission parameter performance so as to save on overall fuel consumption while minimizing emission output while meeting operating constraints, such as but not limited to mission time constraints.

Railways are very complex systems that include an extensive network of railroad tracks that typically have multiple trains operating or traveling on the tracks at any given time. The track network is divided into multiple regions and a dispatcher is assigned to monitor the movement of trains in a respective region of the train network. When an engineer on a train is ready operate and move a train on a track network, the engineer calls the dispatcher and identifies the train and announces the train is prepared to start. Taking into account various factors such as railroad routing rules, origin and destination of the train, speed restrictions and maintenance locations, the dispatcher develops a train route that is divided into multiple route segments.

Usually, route segments are generated in about fifteen to thirty mile increments. Signals from the dispatch center are transmitted to track field equipment such as signal lights, track switches etc. The field equipment is activated to essentially define a segment of the route the train is following. For example, switches may be activated to move the train to another track, or signals may be generated that are representative of the track the train is traveling on and speed limit. In response to the field equipment signals or in response to verbal commands of the dispatcher, the engineer controls the speed of the train on the track.

The engineer is primarily concerned with the speed the train is traveling on the track and arriving at the destination at a desired time. During the course of the trip, an engineer may make decisions to either slow the train, or increase the power output or speed of the train. However, some of these decisions may be dictated solely on the engineering seeing that the train arrives at its destination on time. Accordingly, these decisions may compromise fuel consumption of the train and locomotives.

Many railroads have incorporated at dispatch stations movement planner systems for controlling the movement of a plurality of trains on a track network. Dispatch stations may use these systems to configure segments of a train route; however, as described above, only segments of the entire route are communicated to the track field equipment, responsive to which the engineer manually or a train controller automatically controls the speed of the train.

Presently, there does not exist a system or method onboard a locomotive for predicting an entire route of a train from its origin to its destination. By utilizing such an onboard system that considers the existing railroad track rules and other factors in predicting a route of the train from its origin to its destination. In addition, such as system may be incorporated with mission or trip optimizing systems and methods, such as those disclosed in the above crossed-referenced patent applications, to develop a fuel efficient throttle position strategy for an entire train route from origin to destination.

BRIEF DESCRIPTION OF THE INVENTION

The present invention is for a system that is onboard a vehicle and is used for predicting a route to be traveled by the vehicle using a route network database. A computer system, having a memory, is linked to one or more vehicles in a fleet of vehicles that follow one or more routes in a route network and the routes are determined by one or more dispatchers. In an embodiment, the computer system may be onboard the vehicle. A database is stored in the memory and comprises data relative to the route network including a series of interconnected route segments and a set of routing rules followed by the dispatcher for determining an authorized route the vehicle shall follow. The routing rules include speed restrictions for each route segment. In an embodiment used with trains and locomotives, the database may include a track network made of interconnecting track segments and locations of stations in the track network and the track segments at the stations for entering and exiting a station.

An input mechanism is provided for inputting data relative to an origination location of the vehicle and one or more destinations of the vehicle. In addition, temporary speed restrictions and route maintenance schedules are entered. A processor in the computer system is programmed with a route generation algorithm to take the data relative to the origination location and destination location of the vehicle, and access the database to generate a predicted route that is a prediction of a route that a dispatcher may authorize according to the set of routing rules for the vehicle to follow from the origination location to the destination location. In an embodiment a predicted route may include the identification of each route segment the vehicle is to travel on and the speed at which vehicle is to travel for each route segment.

In a preferred embodiment, the processor is configured to change the predicted route if the vehicle diverges onto an off-route segment. Data relative to the authorized route the vehicle is following, or data relative to route segments the vehicle will follow, is received by the processor to change the predicted route to an alternate predicted route in the event the train diverges or will diverge from a route segment on the predicted route to an off-route segment, the alternate predicted route defined by a starting location, which is the off-route segment, and the destination.

In another preferred embodiment the system and method are implemented as a component of a routing system that is used to optimize the efficiency of fuel consumption, minimize the emission output or travel time of the vehicle by factoring operation and physical characteristics of the vehicle and physical characteristics of the route segments. By predicting the authorized route the vehicle computer system develops a strategy for controlling the speed of the vehicle according to the predicted route instead of reacting to the signals received from route field equipment that defines segments of the route.

DETAILED DESCRIPTION OF THE INVENTION

Figure 1:
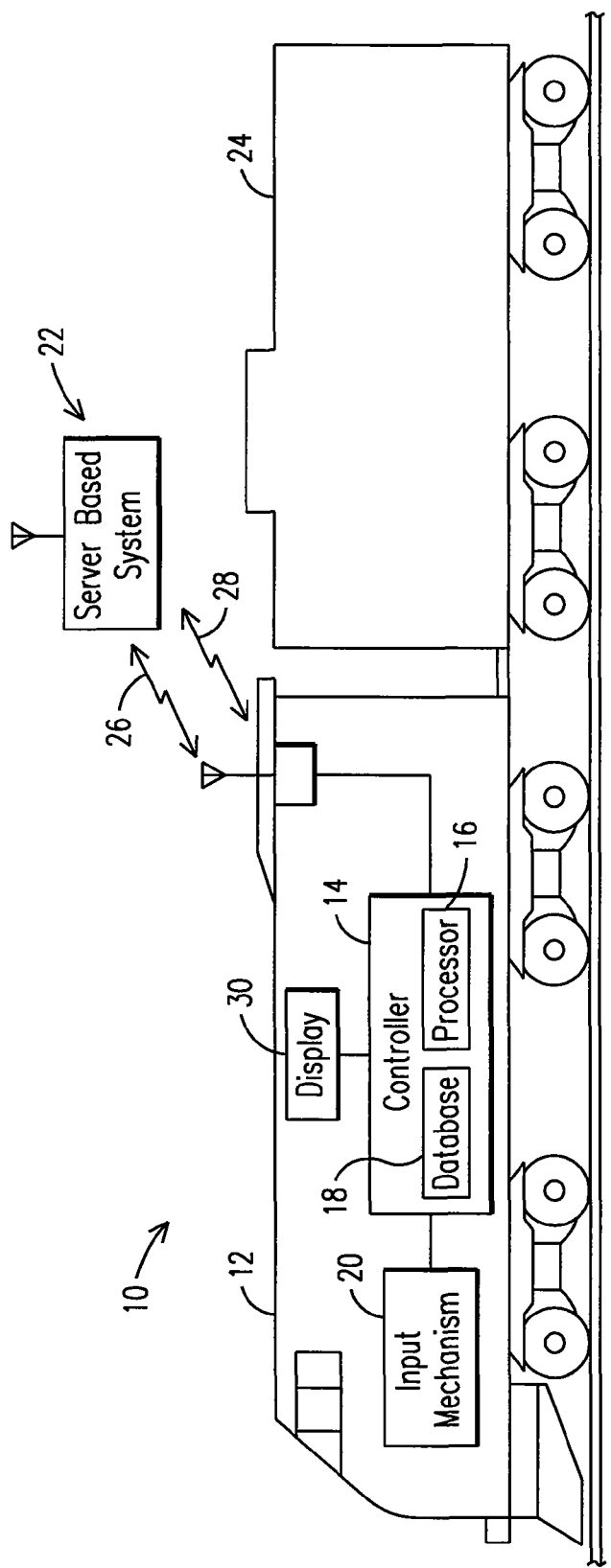
FIG. 1 is a schematic illustration of a hardware configuration for the invention onboard a locomotive.

Before describing in detail the particular method and apparatus predicting a train route in accordance with the present invention, it should be observed that the present invention resides primarily in a novel combination of hardware and software elements related to said method and apparatus. Accordingly, the hardware and software elements have been represented by conventional elements in the drawings, showing only those specific details that are pertinent to the present invention, so as not to obscure the disclosure with structural details that will be readily apparent to those skilled in the art having the benefit of the description herein.

Though exemplary embodiments of the present invention are described with respect to rail vehicles, or railway transportation systems, specifically trains and locomotives having diesel engines or locomotives powered by electricity, exemplary embodiments of the invention are also applicable for other uses, such as but not limited to off-highway vehicles, marine vessels, stationary units, and, agricultural vehicles, transport buses, each which may use at least one diesel engine, or diesel internal combustion engine. Towards this end, when discussing a specified mission, this includes a task or requirement to be performed by the diesel powered system. Therefore, with respect to railway, marine, transport vehicles, agricultural vehicles, or off-highway vehicle applications this may refer to the movement of the system from a present location to a destination. Furthermore, though diesel powered systems are disclosed, those skilled in the art will readily recognize that embodiment of the invention may also be utilized with non-diesel powered systems, such as but not limited to natural gas powered systems, bio-diesel powered systems, etc. Furthermore, as disclosed herein such non-diesel powered systems, as well as diesel powered systems, may include multiple engines, other power sources, and/or additional power sources, such as, but not limited to, battery sources, voltage sources (such as but not limited to capacitors), chemical sources, pressure based sources (such as but not limited to spring and/or hydraulic expansion), current sources (such as but not limited to inductors), inertial sources (such as but not limited to flywheel devices), gravitational-based power sources, and/or thermal-based power sources.

In addition, although reference is made to an onboard processor or computer system, one or more functions of the present invention may be performed off-board computer systems that are linked to one or more vehicles in a fleet of vehicles.

With respect to FIG. 1 there is schematically illustrated a train 10 with a locomotive 12 and a plurality of railcars 24. The train 10 may also have one or more remote locomotives dispersed among the railcars 24. The locomotive 12, preferably the lead locomotive, if there also remote locomotives, is equipped with an onboard computer system 14 that has a database 18 and a processor 16 for processing data in the database 18. In addition, the locomotive 12 may have an onboard an input mechanism 20 for entering data in the controller 14, which data is processed using data in the database to generate a predicted train route. The input mechanism may also include on off-board server based system 22 that transmits data to the controller 14 to generate the predicted train route.

Figure 2:
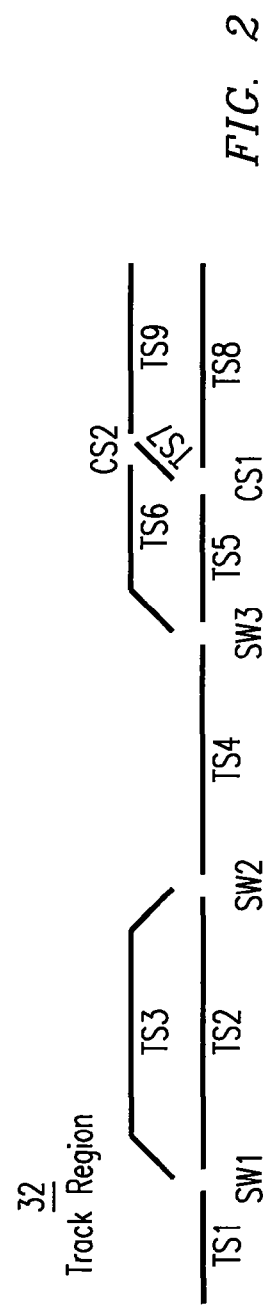
FIG. 2 is a schematic illustration of a region of a track network.

That database 18 has data stored in a memory, which data is related to a railroad track network comprising a series of track segments and data representative of railroad routing rules used by dispatchers to formulate train routes. The term dispatcher as used in this specification and in the claims shall include not only human dispatchers but also any automated systems that perform dispatcher functions. In addition, data relative to the location of dispatch stations along the track network or track segments may be stored in the database 18 including the identity of the different station tracks for entering and exiting the station. More specifically, the track network data includes a track identifier and a track segment identifier for each track segment within a track. With reference to FIG. 2 there is a schematic of plurality of interconnected track segments that represent a track region 32 within a track network. A single track region may literally contain hundreds of track segments, and the simplified region shown in FIG. 2 is provided for convenience in describing the present invention. As illustrated, the different track segments are designated TS1, TS2, TS3 etc. As noted above the data in database 18 include track identifier data. For example, a track identified as track 110 (see Table I) includes track segments TS1, TS2, TS4, TS5 and TS8. The database 18 may also include a track segment length for each track segment, which may be used to calculate the overall distance of the train route.

The track network is preferably divided into track regions which may correspond to railroad track subdivisions, and each region is assigned an identifier. For each track region, there is data relative to locations of stations within a respective region. In addition, for each station location there is identified one or more tracks that a train may enter and exit a station location The database 18 may also contain track segment connecting data that identifies which track segments are connected to one another and the ends at which the track segments are connected. More specifically, the track segments include a first end and second end, which are typically identified as a high end and low end respectively. In reference to FIG. 2, the low end of each of the track segments is the left end of each track segment and the high end is the right end of each track segment. Where an end of a track segment is connected at one end to two tracks, each of the two tracks is categorized as a primary or secondary connecting segment. For example, in reference to FIG. 2, track segment TS4 has a low end primary connection to track segment TS2 (at the high end of TS2) and TS4 has low end secondary connection to track segment TS3 (at the high end of TS3). In addition, TS4 has a high end primary connection to track segment TS5 (at the low end of TS5) and a high end primary connection to track segment TS6 (at the low end of TS6).

In addition, to the foregoing data the database 18 may also contain data relative to switches on a track network. In reference to FIG. 2, switches are identified on the track 24 as SW1, SW2, SW3 and cross switches are identified as CS1 and CS2. More specifically, the database may include data pertaining to the location of each switch relative to track segments. For example, switch SW2 (in the below table the switches are referred to as divergent devices) is located at the high end of track segments TS2 and TS3, and at the low end of TS4.

The database 18 may also contain data that is representative of the railroad routing rules. Such routing rules may include rules pertaining to a preferred direction of travel for each track segment. With respect to direction of travel, designations are assigned to the directions that indicate a direction in which there may be some cost benefit or a constraint. For example, the designation NEUTRAL means that the track may be traveled in either direction, or there is no benefit or constraint in either direction. A designation of HIGHBOUND means that the preferred direction is entering the track segment from a low end of the track and traveling toward the high end of the track. A designation of LOWBOUND means that the preferred direction is entering the track segment from a high end of the track and traveling toward the low end of the track. For example, in the below referenced table track segment TS6 has a preferred direction of LOWBOUND which means, in reference to FIG. 2, that the preferred direction of travel is from right to left on track segment TS6. A designation of AVOID means that the track should be avoided if at all possible. This may be appropriate for siding rails in a track network.

In addition, the database 18 may include weight restrictions of railcars relative to one or more of the track segments in the track network. In addition, the database 18 may include data relative to restrictions on the length of a train, restrictions on the width of railcars or restrictions on the type of cargo (i.e. hazardous materials) relative to one or more of the track segments in the track network.

The above referenced data relative to track segments and switching equipment for the track segments shown in FIG. 2, are set forth in the below table:

TABLE I

| Track Segment Id | TS1 | TS2 | TS3 | TS4 | TS5 | TS6 | TS7 | TS8 | TS9 |
|---|---|---|---|---|---|---|---|---|---|
| Track Id | 110 | 110 | 111 | 110 | 110 | 112 | 113 | 110 | 112 |
| Segment Length | 14,695 | 12,786 | 12,347 | 19,808 | 22,264 | 22,743 | 550 | | |
| HighEnd Primary Connecting Segment | TS2 | TS4 | TS4 | TS5 | TS8 | TS9 | TS9 | 0 | 0 |
| HighEnd Secondary Connecting Segment | TS3 | 0 | 0 | TS6 | TS7 | 0 | 0 | 0 | 0 |
| HighEnd Divergent Device | SW1 | SW2 | SW2 | SW3 | CS1 | CS2 | CS2 | 0 | 0 |
| LowEnd Primary Connecting Segment | 0 | TS1 | TS1 | TS2 | TS4 | TS4 | TS5 | TS5 | TS6 |
| LowEnd Secondary Connecting Segment | 0 | 0 | 0 | TS3 | 0 | 0 | 0 | 0 | TS7 |
| LowEnd Divergent Device | 0 | SW1 | SW1 | SW2 | SW3 | SW3 | CS1 | CS1 | CS2 |
| Preferred Direction | NEUTRAL | NEUTRAL | AVOID | NEUTRAL | HIGHBOUND | LOWBOUND | NEUTRAL | | |

Figure 3:
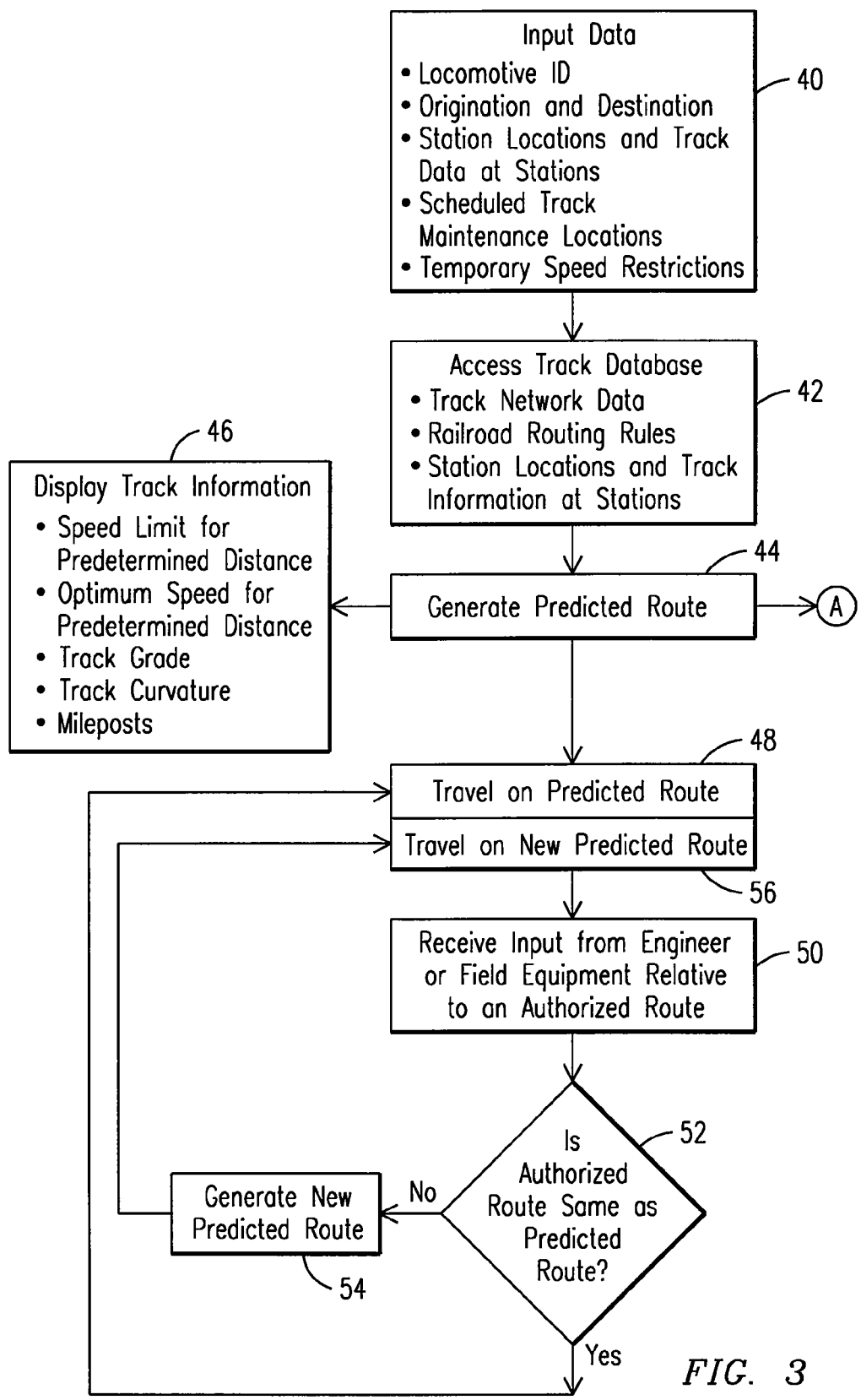
FIG. 3 is a flow chart including steps for practicing the invention.

With reference to FIGS. 1, 2 and 3, and the above-referenced Table I, there is now described a method for predicting a train route. In FIG. 3 there is shown a flow chart including steps for the method. In an initial step 40 data relative to the identification of the locomotive 12 and the train 10 origination and destination locations for a train route are input into the onboard controller 14. In addition, data relative to temporary speed restrictions and data relative to scheduled track maintenances for each of the potential track segments from the origination to the destination are input into the onboard controller 14. The data may be entered via the input mechanism 20 and/or the off-board server based system 22. In the case when an engineer is preparing to travel on a track network, the engineer inputs the locomotive 12 identification number assigned to the locomotive 12, and this information is transmitted via signal 26 (FIG. 1) to the server-based system 22, which then transmits via signal 28 (FIG. 1) the data relative to the train 10 origination location and destination location. As described above, the data relative to temporary speed restrictions and schedule track maintenance may also be included in this transmission.

When the above described data is entered the processor (step 42) accesses the database 18 including the track network data, railroad routing data and the station location data. Using the input data (step 40) entered in step 42, the processor 16 in step 44 generates a predicted train route for the origination and destination locations for the locomotive 12. The controller 14/processor 16 may utilize known software for developing train routes at dispatch stations. Routing through the network of track segments may be computed using any network routing algorithm such as the well known Shortest Path First algorithm.

By way of first example, and in reference to FIG. 2 and Table I, an origination location of track segment TS1 and destination location of TS8 is entered in controller 14. The display 30, assuming there are not any scheduled track maintenances, should show a predicted route from TS1 to TS2 to TS4 to TS5 to TS8. As shown in the Table I the primary connecting track segment to TS1 is TS2, the primary connecting segment to TS2 is TS4 which also has a preferred direction of travel of NEUTRAL. So the train can travel on TS1, TS2 and TS4 to TS5. The track segment TS5 has a preferred direction of travel of HIGHBOUND so the train can travel on TS5 to TS8 its destination.

In a second example, an origination location of TS9 and destination location of TS1 is entered in controller 14. In reference to Table I, TS9 has a preferred direction of travel in the LOWBOUND (right to left) direction. As shown in FIG. 2, both TS6 and TS7 are connected to TS9; however, TS6 has a preferred direction of travel of LOWBOUND, which is selected over the NEUTRAL direction of TS7. The train can then travel the connecting tracks of TS4, TS2 and TS1 because of their NEUTRAL preferred direction of travel.

The system may include in the database 18, or in a separate accessible database, a list of predicted routes a train 10 has traveled so that when the identification of the locomotive 12 and/or train 10 with the origination and destination locations, the algorithm may match the train 10 with a previously predicted route. When the previous predicted route is identified the new predicted route may be generated using the previous predicted route as an initial route and factoring in the updated restrictions such as temporary speed restrictions or track maintenance schedules. In this manner, the algorithm is configured to reduce the amount of time required for the processor to generate a predicted route. In an embodiment, the previously predicted routes may be limited to those routes having been predicted within a predetermined time period, i.e. routes predicted within the past five days.

Figure 4:
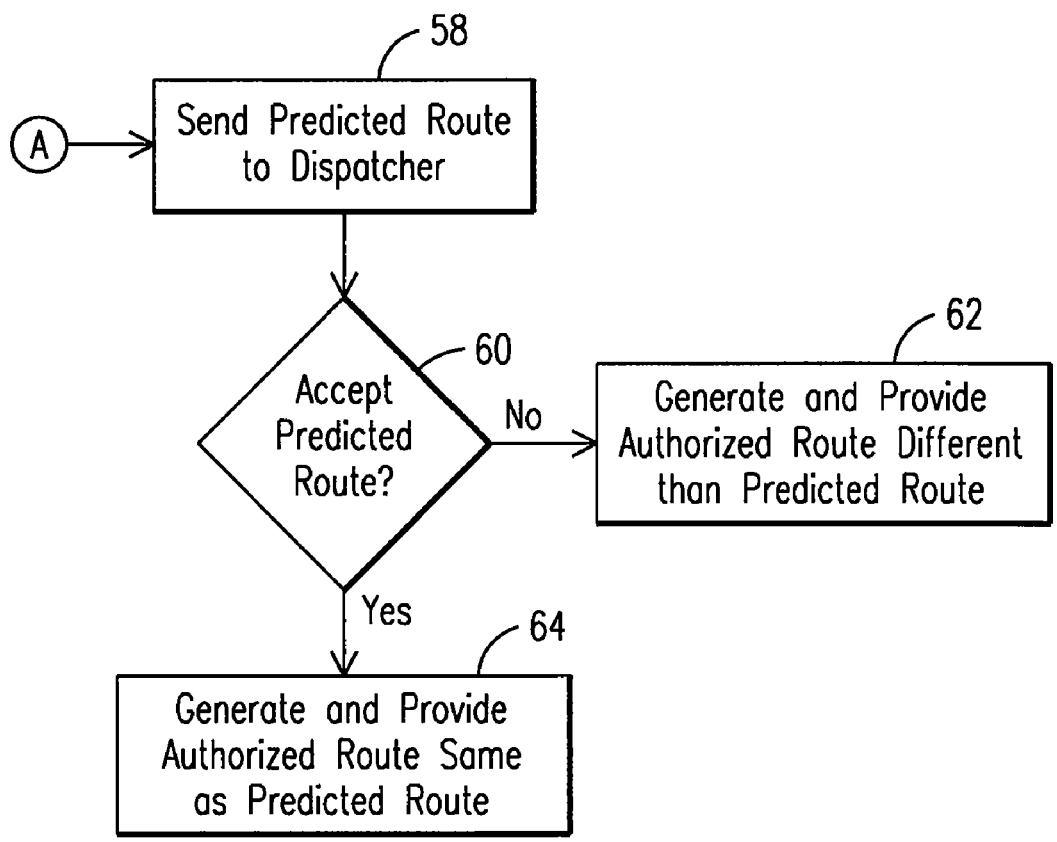
FIG. 4 is a flow chart continued from the flow chart in FIG. 3.

With respect to FIG. 4, in an embodiment the predicted route may be sent from the locomotive 12 to the dispatcher, as described in step 58. In step 60 the dispatcher has the option to accept the predicted route or not accept the predicted. If the dispatcher chooses not to accept the predicted route, the dispatcher will generate and provide an authorized route that is different than the predicted, as described in step 62. In step 64, the dispatcher may accept the predicted route and provide an authorized route that is the same as the predicted route. If necessary, the dispatcher may activate switches according to the authorized predicted route so the train can travel along the authorized predicted route. This embodiment may be effective for locomotive track networks experiencing light train traffic, or it may be effective for such off highway route networks, such as shipping routes, that don't experience heavier traffic loads as in busy locomotive track networks.

The present invention may be configured as a component of a trip optimization computer program that is used for example to optimize fuel efficiency while minimizing emissions output for a trip as described in the above cross-referenced patent applications which have been incorporated herein. One or more controllers may be configured to implement trip optimization system so when the predicted train route data is generated the optimization system generates a throttle position strategy for the entire route. In step 56, the controller 16 generates a throttle position strategy that is computed using trip optimization algorithm which factors in such variables track grade, curvatures and elevations. In addition, characteristic data maybe entered via the off board server-based system 22. This data may include the physical and performance data on each locomotive, its type, weight, length, cross sectional area, horsepower and other known characteristics considered in optimizing fuel efficiency. Similar data is provided for the railcars as well. The trains may also be defined in the database with an identifier, train speed limit, and lists of locomotive types and railcar types. In this manner, a throttle position strategy for the train route is generated that provides one or more throttle positions or speed limits for each track segment and for defined distances over the route.

Again with reference to the track network data and as noted above, the track network data is divided into regions each of which is a defined geographic entity of the track network. Each of these regions may typically correspond to a railroad subdivision. To the extent that a train route may cover more than one region of a train network, the predicted train route may comprise a route for each of the regions covered in the train route. In step 46, the controller may display on display 30, track information for a defined region within the predicted train route. As shown in step 46 the display 30 may display a speed limit for a predetermined distance on the predicted route, an optimized speed limit for a predetermined distance on the predicted route, track grade and curvature information and milepost information In a preferred embodiment of the invention, the system and method are able to dynamically adapt the predicted route in the event the train 10 diverges from the predicted route. In step 50 the locomotive receives signals or input data relating to the authorized route from field equipment such as switches. These signals or input essentially identify the location of the train 10 on the authorized route or identify where (which track segments) the train will be traveling over some predetermined distance In the above first example of a predicted train route, there is a switch SW1 connected to a high end of TS1 and a low end of TS3. The predicted train route has the train 10 travel on TS1 and then TS2; however, during the course of traveling an authorized route, the locomotive 10 receives a signal that indicating the switch SW1 is connecting TS1 to TS3. As the switch SW1 is not connected to TS2, as predicted, the processor 16 in step 52, or TS3 is not part of the predicted route, the processor 16 identifies the divergence or track segment TS3 and in step 54 generates a new predicted route using the train's present location or track segment TS3 as the origination location to adapt the predicted route to include track segment TS3. For example, track segment TS3 may have different associated speed restrictions requiring the train to reduce speed, or fewer constraints on speed allowing the train 10 to increase speed. In addition, the trip optimization system will update the throttle position for the new predicted train route.

In another embodiment, the algorithm may be configured to reduce the time necessary to generate the new route when there is a divergence of the original predicted route. For example, if the train 10 or computer system on the locomotive 12 determines the train has, or will diverge from the predicted route, the algorithm may be configured to identify the point at which the divergent route intersects the predicted route. In this manner, the algorithm may take the remaining segments in the predicted and simply copy the remaining route for generating the new route, instead of regenerating that remaining portion of the route.

While the preferred embodiments of the present invention have been shown and described herein, it will be obvious that such embodiments are provided by way of example only and not of limitation. Numerous variations, changes and substitutions will occur to those skilled in the art without departing from the teaching of the present invention. Accordingly, it is intended that the invention be interpreted within the full spirit and scope of the appended claims.

What is claimed is:

1. A control system for a vehicle, the system comprising:
an input mechanism configured to be disposed onboard a powered rail vehicle configured to travel over tracks of a route network and for receiving, from an off-board system disposed off of the rail vehicle, at least one of a designated location for the rail vehicle to travel toward in the route network or a designated route for the rail vehicle to travel along toward the designated location; and
a controller configured to be disposed onboard the rail vehicle and to receive the at least one of the designated location or the designated route from the input mechanism, the controller including a memory that is configured to store routing rules that restrict travel of the vehicle on one or more route segments of the route network,
wherein the controller is configured to at least one of store or obtain at least one of track network data or the routing rules that are representative of restrictions of the one or more route segments of the tracks in the route network;
wherein the controller is configured to generate an alternate route for the rail vehicle to travel along toward the designated location when actual travel of the rail vehicle deviates from the designated route, the alternate route being based on the routing rules and generated by the controller as the rail vehicle moves in the route network,
wherein the controller is configured to transmit the alternate route to the off-board system for acceptance or rejection of the alternate route as an authorized route for the rail vehicle to travel on in the route network, and
wherein the route network includes track field equipment that is configured to be activated to control which of the route segments are able to be traversed by the rail vehicle, and the controller is configured to transmit the alternate route to the off-board system for coordination with the field equipment to allow the rail vehicle to travel along the alternate route.

2. The system of claim 1 wherein the routing rules include one or more speed restrictions for one or more of the route segments.

3. The system of claim 1 wherein the controller is configured to identify the route segments over which the vehicle is to travel in the alternate route in order to travel toward the designated location.

4. The system of claim 1 wherein the controller is configured to provide one or more recommended speeds to travel on the alternate route to an operator on the rail vehicle.

5. The system of claim 1 wherein the controller is configured to generate the alternate route when the vehicle diverges or will diverge from one or more route segments on the designated route to an off-route segment, and wherein the alternate route is generated by connecting a current location of the rail vehicle to one or more of the route segments that interconnect the current location with the designated location.

6. The system of claim 1 wherein the alternate route includes a first route segment that intersects a second route segment of the designated route and a remaining portion of the designated route includes one or more common route segments as the alternate route, further wherein the controller is configured to copy the remaining portion of the designated route from the intersection toward the designated location to generate the alternate route.

7. The system of claim 1 wherein the controller is configured to obtain data relative to one or more previously generated routes associated with the designated location and to select at least one of the previously generated routes as the alternate route.

8. The system of claim 1 wherein the routing rules include one or more of temporary speed restrictions or route segment maintenance schedules associated with one or more of the route segments.

9. The system of claim 1 wherein the controller is configured to communicate the alternate route to a display disposed onboard the rail vehicle for displaying one or more portions of the alternate route to an operator of the rail vehicle.

10. The system of claim 1 wherein the controller is configured to provide at least one of recommended speeds or throttle positions of the rail vehicle when following the alternate route, the at least one of recommended speeds or throttle positions determined in order to reduce at least one of fuel consumption, travel time, or emissions output of the rail vehicle as the rail vehicle travels toward the designated location according to the alternate route relative to traveling toward the designated location using other recommended speeds or throttle positions.

11. The system of claim 10 further comprising a display configured to be disposed onboard the rail vehicle for displaying one or more portions of the alternate route generated by the controller and the at least one of recommended speeds or throttle positions associated with the one or more portions for the vehicle along the alternate route.

12. The system of claim 1 wherein the controller is configured to obtain data relative to one or more temporary speed restrictions for one or more of the route segments, the controller further configured to generate the alternate route based on the one or more temporary speed restrictions.

13. The system of claim 1 wherein the controller is configured to obtain data relative to one or more speed limits for one or more of the route segments, the controller further configured to generate the alternate route based on the one or more speed limits.

14. The system of claim 1 wherein the controller is configured to obtain data relative to scheduled maintenance of one or more of the route segments, the controller further configured to generate the alternate route based on the scheduled maintenance.

15. The system of claim 1 wherein the track network data includes at least one of identifiers assigned to the route segments, identifiers of which route segments are connected to other route segments, a length of one or more of the route segments, a location of one or more switches in the route network relative to route segments, or a recommended direction of travel over one or more of the route segments.

16. The system of claim 1 wherein the track network data comprises at least one of a location of one or more rail vehicle stations in the route network or a location one or more route segments that provide an entrance into or an exit out of the one or more rail vehicle stations.

17. The system of claim 1 wherein the track network data comprises at least one of a physical characteristic of the rail vehicle or cargo on the rail vehicle.

18. The system of claim 1 wherein the controller is configured to provide at least one of recommended speeds or throttle positions for the rail vehicle when following the alternate route, the at least one of recommended speeds or throttle positions determined in order to reduce at least one of fuel consumption, travel time, or emissions output of the rail vehicle as the rail vehicle travels toward the designated location according to the alternate route relative to traveling toward the designated location using other recommended speeds or throttle positions.

19. The system of claim 18 wherein the controller is configured to generate a command responsive to the at least one of recommended speeds or throttle positions to control movement of the rail vehicle.

20. The system of claim 1 wherein the routing rules include at least one of locations or positions of switches that couple two or more route segments.

21. The system of claim 1 wherein the routing rules include a weight restriction associated with one or more of the route segments, the weight restriction indicating a limit on a weight of the rail vehicle traveling over the one or more route segments.

22. The system of claim 1 wherein the route network includes one or more switches that couple two or more route segments, and the controller is configured to communicate the alternate route to the off-board system so that the off-board system can control positions of the switches to permit the rail vehicle to travel along the alternate route.

23. The system of claim 1 wherein the input mechanism is configured to be coupled with the controller such that the controller receives the at least one of the designated location or the designated route from the input mechanism.

24. A vehicle control system comprising:
an input mechanism configured to be disposed onboard a powered rail vehicle configured to travel over tracks of a route network and for receiving, from an off-board system disposed off of the rail vehicle, at least one of a designated location for the rail vehicle to travel toward in the route network or a designated route for the rail vehicle to travel along toward the designated location; and
a controller configured to be disposed onboard the rail vehicle and to receive the at least one of the designated location or the designated route from the input mechanism, the controller including a memory that is configured to store routing rules that restrict travel of the rail vehicle on one or more route segments of the route network,
wherein the controller is configured to generate an alternate route for the rail vehicle to travel along toward the designated location when actual travel of the rail vehicle deviates from the designated route, the alternate route being based on the routing rules and generated by the controller as the vehicle moves in the route network, wherein the controller is configured to transmit the alternate route to the off-board system for acceptance or rejection of the alternate route as an authorized route for the vehicle to travel on in the route network, wherein the route network includes track field equipment that is configured to be activated to control which of the route segments are able to be traversed by the rail vehicle, and the controller is configured to transmit the alternate route to the off-board system for coordination with the field equipment to allow the rail vehicle to travel along the alternate route, wherein the controller is configured to provide one or more recommended speeds or throttle positions for the rail vehicle when following the alternate route in order to reduce at least one of fuel consumed, emissions generated, or travel time of the rail vehicle toward the designated location relative to traveling toward the designated location according to other recommended speeds or throttle positions.

25. The system of claim 24 wherein the routing rules include one or more speed restrictions for one or more of the route segments.

26. The system of claim 24 wherein the controller is configured to identify the route segments that the rail vehicle is to travel along in the alternate route and the one or more recommended speeds or throttle positions of the rail vehicle for one or more of the route segments.

27. The system of claim 24 wherein the controller is configured change the designated route to the alternate route that is defined by connecting a current location of the rail vehicle to a first segment that is outside of the designated route and that is interconnected with the designated location.

28. The system of claim 24 wherein the alternate route includes a first route segment that intersects a second route segment of the designated route and a remaining portion of the designated route includes one or more of the same route segments as the alternate route, and the controller is configured to copy the remaining portion of the designated route from an intersection of the first route segment and the second route segment to generate at least a portion of the alternate route.

29. The system of claim 24 wherein the controller is configured to obtain data relative to one or more previously generated routes associated with the designated location and to select at least one of the previously generated routes as the alternate route.

30. The system of claim 24 wherein the controller is configured to communicate the alternate route to a display disposed onboard the rail vehicle for displaying one or more portions of the alternate route to an operator of the rail vehicle.

31. The system of claim 30 wherein the controller is configured to communicate the one or more recommended speeds or throttle positions of the rail vehicle along the alternate route to the display for presentation to the operator.

32. The system of claim 24 wherein the controller is configured to obtain data relative to one or more temporary speed restrictions for one or more route segments, the controller further configured to generate the alternate route based on the one or more temporary speed restrictions.

33. The system of claim 24 wherein the controller is configured to obtain data relative to scheduled maintenance of one or more of the route segments, the controller further configured to generate the alternate route based on the scheduled maintenance.

34. The system of claim 24 wherein the controller is configured to transmit the alternate route to the off-board system for acceptance or rejection of the alternate route as an authorized route for the rail vehicle to travel on in the route network.

35. The system of claim 24 wherein the routing rules include at least one of locations or positions of switches that couple two or more route segments.

36. The system of claim 35 wherein the route network includes one or more switches that couple two or more route segments, and the controller is configured to communicate the alternate route to the off-hoard system so that the off-board system can control positions of the switches to permit the rail vehicle to travel along the alternate route.

37. The method of claim 36 further comprising displaying one or more portions of the alternate route and the one or more recommended speeds or throttle positions for the rail vehicle along the alternate route.

38. The system of claim 35 wherein the input mechanism is configured to be coupled with the controller such that the controller receives the at least one of the designated location or the designated route from the input mechanism.

39. The system of claim 24 wherein the route segments are portions of one or more railroad tracks.

40. A method for controlling a vehicle, the method comprising:
at least one of storing or obtaining one or more of track network data or routing rules that are representative of restrictions of one or more route segments of tracks in a route network;
obtaining a designated route for a powered rail vehicle to travel over tracks in the route network toward a designated location and the routing rules, the designated route being received from an off-board system or generated based on the designated location that is received from the off-board system;
monitoring actual travel of the vehicle in the route network;
generating an alternate route for the vehicle to travel along toward the designated location when the actual travel of the vehicle deviates from the designated route, the alternate route generated onboard the vehicle and based on the routing rules as the vehicle moves in the route network; and
transmitting the alternate route to an off-board system for acceptance or rejection of the alternate route as an authorized route for the rail vehicle to travel on in the route network and for coordination with field equipment that is configured to be activated to control which of the route segments are able to be traversed by the rail vehicle to allow the rail vehicle to travel along the alternate route.

41. The method of claim 40 wherein generating the alternate route includes changing the designated route to the alternate route when the rail vehicle diverges or will diverge from one or more route segments on the designated route to an off-route segment, and wherein the alternate route is generated by connecting a current location of the vehicle to one or more route segments that interconnect the current location with the designated location.

42. The method of claim 40 wherein the alternate route includes a first route segment that intersects a second route segment of the designated route, and a remaining portion of the designated route includes one or more of the same route segments as the alternate route, and wherein generating the alternate route includes copying the remaining portion of the designated route from an intersection between the first route segment and the second route segment to generate the alternate route.

43. The method of claim 40 wherein generating the alternate route includes accessing one or more previously generated designated routes associated with the designated location and selecting at least one of the one or more previously generated designated routes as the alternate route.

44. The method of claim 40 further comprising displaying one or more portions of the alternate route to an operator disposed onboard the rail vehicle.

45. The method of claim 40 further comprising obtaining one or more temporary speed restrictions for one or more of the route segments, wherein the alternate route is generated based on the one or more temporary speed restrictions.

46. The method of claim 40 further comprising obtaining a scheduled maintenance of one or more of the route segments, and wherein the alternate route is generated based on the scheduled maintenance.

47. The method of claim 40 further comprising transmitting the alternate route to an off-board system for acceptance or rejection of the alternate route as an authorized route for the rail vehicle to travel on in the route network.

48. The method of claim 40 wherein the routing rules include at least one of locations or positions of switches that couple two or more route segments, and the alternate route is generated based on the at least one of locations or positions of the switches.

49. The method of claim 40 wherein the routing rules include a weight restriction associated with one or more of the route segments, the weight restriction indicating a limit on a weight of the rail vehicle traveling over the one or more route segments, and the alternate route is generated based on the weight restriction.

50. The method of claim 40 wherein the route network includes one or more switches that couple two or more route segments, and further comprising communicating the alternate route to an off-board system that controls positions of the switches to permit the rail vehicle to travel along the alternate route.

51. A vehicle control system comprising:
a controller configured to be disposed onboard a powered rail vehicle configured to travel over tracks of a route network and to access routing rules that restrict travel of the rail vehicle on one or more route segments of the route network, the controller configured to obtain a designated route for the rail vehicle to travel along toward a designated location,
wherein the controller is configured to at least one of store or obtain at least one of track network data or the routing rules that are representative of restrictions of the one or more route segments of the tracks in the route network;
wherein the controller is configured to generate an alternate route for the rail vehicle to travel along toward the designated location when actual travel of the rail vehicle deviates from the designated route, the alternate route being based on the routing rules and generated by the controller as the rail vehicle moves in the route network,
wherein the controller is configured to transmit the alternate route to the off-board system for acceptance or rejection of the alternate route as an authorized route for the rail vehicle to travel on in the route network, and
wherein the controller is configured to communicate the alternate route to an off-board system that controls switches in the route network so that the off-board system can actuate the switches to direct travel of the rail vehicle in the route network along the alternate route.

52. The system of claim 51, wherein the switches couple two or more of the route segments to control which route segments over which the rail vehicle travels.

* * * * *